2,744,351

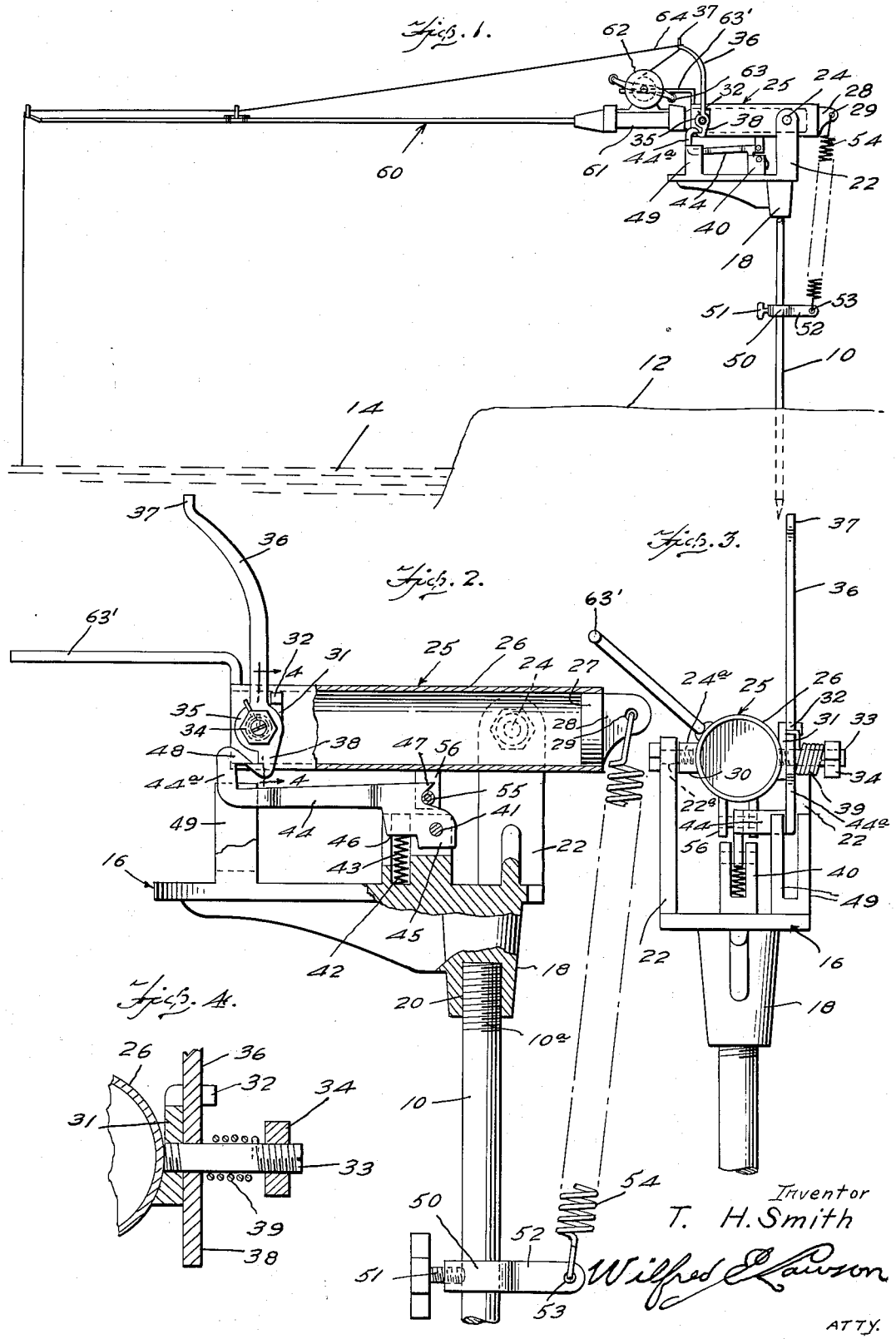

FISHING POLE HOLDER

Thomas H. Smith, Oklahoma City, Okla.

Application October 15, 1953, Serial No. 386,186

1 Claim. (Cl. 43—16)

This invention relates generally to the class of fishing and trapping and is directed particularly to an automatic hook setting device.

A principal object of the present invention is to provide a fishing accessory designed to support a fishing pole with means for connection with the fishing line whereby a strike will effect the automatic and rapid lifting of the pole to quickly set the hook.

Another object of the invention is to provide a fishing accessory of the above described character with means for securing a fishing reel to prevent the spinning of the reel spool when the setting device is actuated.

Still another object of the invention is to provide in a fishing accessory of the above described character, a trigger mechanism with which the fishing line is connected in such a way that there is no slack in the line to be taken up when the trigger is actuated for effecting the lifting of the pole and the setting of the hook, as a result of which the hook is set quickly and the possibility of the fish throwing off the hook before it is set, is eliminated.

A still further object of the invention is to provide in a fishing accessory of the above described character, a spring actuated pivoted pole supporting socket with an adjustable spring actuator, by means of which the pole supporting socket can be set to be lifted for the setting of the hook with different degrees of strength dependent upon the type of fish being caught.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawing:

Figure 1 is a view in side elevation of the fishing accessory of the present invention showing the same in set position on the bank of a body of water with a fishing pole mounted thereon ready for action.

Figure 2 is a view, on an enlarged scale of the device in set position without the pole, parts being broken away for a clearer showing of the details.

Figure 3 is a view in front elevation of the device as shown in Figure 2.

Figure 4 is a detail section taken substantially on line 4—4 of Figure 2.

Referring now more particularly to the drawing the numeral 10 generally designates a stake or standard which is designed to be forced into the ground 12 at the side of the body of water 14 such as a stream or the like, for the support of the hereinafter described elements.

The numeral 16 generally designates a plate which forms a head for the standard 10. This plate is of materially greater length than width as clearly shown in Figures 2 and 3 and is provided at one end, which may be designated as the inner end, with the downwardly extending lug 18 in which is formed a threaded socket 20 to receive the threaded upper end portion 10a of the standard as illustrated.

Rising from the head plate 16 at the inner end, are the spaced bearing arms 22 which at their upper ends carry the pivot pins or screws 24 which have their inner ends screw threaded as indicated at 24a in Figure 3. The outer end portions of these screws 24 are unthreaded so as to turn in the openings 22a of the arms.

Disposed between the bearing arms 22 is a socket member which is generally designated 25 and which comprises the tubular body 26, having a closure member 27 fitted into its rear end as shown in Fig. 2. This closure member carries on its outer side the ear 28 having an aperture 29 therein for the purpose about to be described.

Adjacent to the rear end of the socket tube 26 there are formed the oppositely extending threaded bosses 30 in each of which a threaded end 24a of a pivot screw 24 is engaged so that the socket tube can swing in a vertical arc.

At the forward end of the socket tube 26, which end is open there is carried on the side of the tube a shoulder member 31 which has a short laterally extending stop finger 32.

Secured in the shoulder member 31 and extending outwardly from the tube is a pin 33 which has threaded on its outer end the nut 34. On this pin is rotatably mounted a collar 35 which carries a relatively long curved trigger arm 36 which terminates at its free end in the short finger 37 which is slightly reversely curved as shown in Figure 2.

Also carried by the collar 35 and extending oppositely from the trigger 36, is a hook member 38 which extends downwardly when the trigger is swung to an upright or vertical position.

Encircling the pin 33 is a coil spring 39, one end of which is secured to the pin, while the other end is engaged across the trigger 36 and this spring is wound or twisted so as to constantly exert a pressure on the trigger 36 tending to swing it to upright position, which movement is limited by the stop 32 as will be clearly apparent from Figure 2.

Located approximately on the longitudinal center of the head plate 16, forwardly of the arms 22, are the two spaced upstanding ears 40 between which is supported a pivot pin 41 as shown in Figure 2, which pin extends transversely of the head plate and forwardly of the pin is a socket 42 which houses an upstanding expansion spring 43.

The numeral 44 designates a latch arm which has a rear end plate portion 45 positioned between the ears 40 and has the pivot pin 41 extending therethrough and forwardly of the pin this plate portion 45 has a shoulder 46 which is engaged by the upper end of the spring 43, whereby the latch 44 is constantly urged upwardly.

Above the pivot 41 the plate portion 45 of the latch is provided with the rearwardly opening or rearwardly facing hook portion 47.

At the forward end the latch arm 44 has the laterally offset upturned end 44a which terminates in the rearwardly directed hook bill portion 48 which is arranged to be engaged by the trigger hook 38 as illustrated.

Also carried by the head plate 16 adjacent to the forward end are the two upstanding spaced guide members 49 between which the finger portion 44a is located.

At the forward end of the socket tube 26 there is secured at the right hand side of the tube and opposite from the trigger 36, the elongate forwardly extending reel crank or handle holding arm 63'. As shown in Figure 3, this arm 63' is laterally offset and at an elevation slightly above the socket tube 26 when the latter is horizontally disposed and the arm also extends a substantial distance forwardly from the open end of the socket tube.

Mounted upon the standard 10 is a collar 50 which is slidable on the standard and which carries a set screw 51 whereby it can be secured in any position on the standard. This collar also has an outwardly extending arm 52 which has an aperture 53 therethrough and in this aperture is engaged one end of a coil spring 54, the other end of which spring is engaged in the aperture 29 of the ear 28 at the rear end of the socket tube 26.

It will be seen from the foregoing that the spring 54, when the holding collar 50 is set at a desired position on the standard 10, can be made to constantly impose a pull on the rear end of the socket so as to swing the socket upwardly to an elevated position. While this position has not been illustrated, it is believed that it will be readily apparent that when the socket tube is released by the hooks 38 and 48 the tube can be swung to a substantially upright position by the spring 54.

As is shown in Figure 2, the hook 47 is of a shallow character and it is positioned to engage across the transversely disposed roller 55 which is supported by and between two members 56 which project from the lower side of the tube 26. The hook 47, being shallow as stated, assists in holding the socket tube in down or set position and at the same time will release the latter when the trigger and latch hooks 38 and 48 are disengaged since the strong pull of the spring 54 will ride the roller 55 out of the hook 47 against the resistance of the spring 43.

In the use of the device the handle of a fishing pole, generally designated 60 is inserted into the socket tube 26 so as to bring the reel seat 61 adjacent to the open forward end of the socket. The reel 62 then has one of its cranks or handles 63 engaged beneath the holding arm 63' which will be substantially parallel with the reel seat as shown in Figure 1 and the fishing line 64 is hooked behind the upstanding trigger finger 37 which, as shown, is located rearwardly of the reel.

When the socket tube 26 is then swung downwardly against the resistance of the spring 54 the trigger hook 38 is engaged beneath the latch hook 48 and the device is then set so that when a fish strikes the tug on the line 64 will shift the trigger 36 sufficiently to disengage the hooks 38 and 48 and the spring 54 will then function to snap the socket tube 26 to an upright position to set the hook in the mouth of the fish.

When the rod is swung upwardly in the manner stated, a quick pull is applied to the fishing line and the reel is prevented from turning by the holding arm 49.

It will be seen from Figure 1 that the line when set has no slack so that when the device operates there is no slack to be taken up and thus the hook is set quickly thereby avoiding the possibility of the fish escaping before such setting takes place.

I claim:

In a fishing pole holder, a standard, an elongated head plate mounted horizontally on the top end of said standard, a pair of transversely spaced arms rising from the rear end of said plate, a tubular socket member pivotally mounted between said arms intermediate its ends and having its forward end open to receive the butt of a fishing pole, a pair of transversely spaced ears rising from said plate forwardly from said arms, an elongated latch arm pivotally supported at its rear end in said ears, a reverted bill formed at the upper side of the forward end of said latch arm, a pivot pin projecting laterally from the forward end of said socket member, an upward and forwardly curved trigger element supported on said pivot pin, a hook formed at the end of said trigger element below said pivot pin and normally engaged with said bill, a finger formed at the upper end of said trigger element for the passage thereabout of the fishing line in advance of a reel mounted on said butt, another ear projecting from the rear end of said socket member, a clamp element secured on said standard, a coil spring extending between the latter ear and the clamp element and acting to exert a downward pull on the rear end of said socket member and to snap its forward end portion and the pole upwardly when a strike on the line exerts a pull on the trigger element and causes the hook on the latter to be disengaged from the said bill, a second coil spring positioned beneath the latch arm forwardly of said ears and acting to constantly urge the latch arm upwardly into position for the bill to be engaged by the hook of the trigger element, a stop element mounted on the under side of said socket member to limit the upward movement of the latch arm under the urge of said second spring, still another coil spring on the outer end portion of said pivot pin and having one of its ends secured thereto and its other end extending across the forward side of said trigger element to urge the latter into its normally set upright position, and a second stop element for holding the trigger element in its set position under the urge of said another coil spring.

References Cited in the file of this patent
UNITED STATES PATENTS

| | | |
|---|---|---|
| 371,777 | McCabe | Oct. 18, 1887 |
| 693,071 | Ruud | Feb. 11, 1902 |
| 1,317,843 | Wehner et al. | Oct. 7, 1919 |
| 1,957,853 | Sibley | May 8, 1934 |
| 2,340,588 | Groves | Feb. 1, 1944 |
| 2,657,492 | Skorr | Nov. 3, 1953 |

FOREIGN PATENTS

| | | |
|---|---|---|
| 7,759 | Great Britain | 1893 |